UNITED STATES PATENT OFFICE.

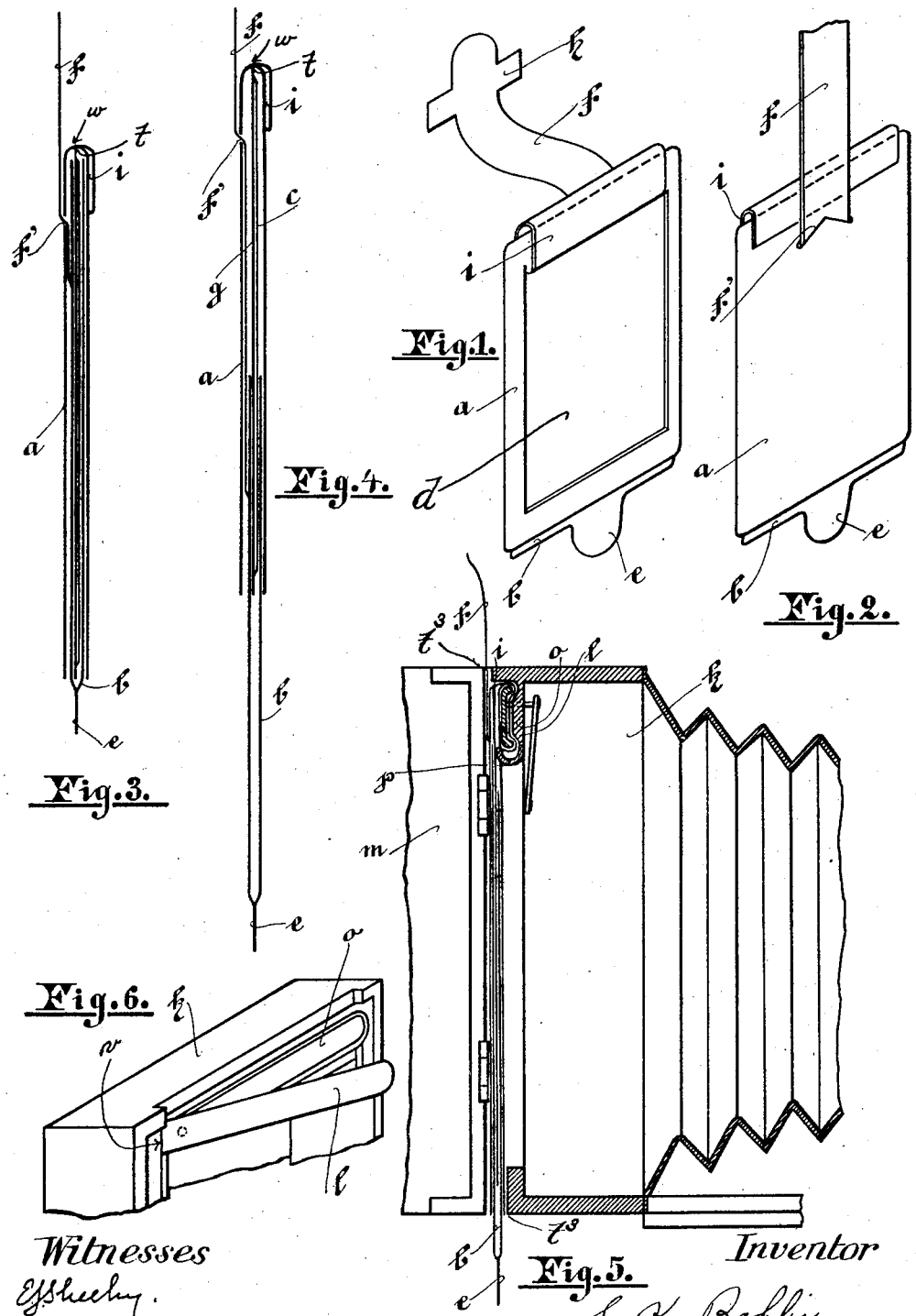

SAMUEL KONRAD BOHLIN, OF GOTTENBORG, SWEDEN.

PHOTOGRAPHIC PLATE OR FILM HOLDER AND CAMERA ADAPTED TO RECEIVE THE SAME.

1,015,130.     Specification of Letters Patent.     Patented Jan. 16, 1912.

Application filed February 28, 1911. Serial No. 611,426.

*To all whom it may concern:*

Be it known that I, SAMUEL KONRAD BOHLIN, citizen of Sweden, residing at Gottenborg, in the Province of Gottenborg and Bohus and Kingdom of Sweden, have invented new and useful Improvements in Photographic Plate or Film Holders and Cameras Adapted to Receive Same, of which the following is a specification.

My present invention relates to casings or holders for photographic plates or films and cameras adapted to receive said casings or holders and in which the same may be secured and manipulated; and its novelty, utility and practical advantages will be fully understood from the following description and claims.

In the accompanying drawing Figure 1 is a perspective front view of the holder and Fig. 2 a similar back view. Fig. 3 shows in section the general arrangement of the bags with plate or film when closed and Fig. 4 is a sectional view with the outer bag partly drawn. Fig. 5 is a vertical section of the rear part of a camera with holder inserted and Fig. 6 is a perspective view of the top of the said rear part of the camera showing the device for keeping the holder in place.

The holder consists of two bags $a$ and $b$ of thin light excluding material such as black paper, with the bag $b$ inserted into the bag $a$, the latter carrying the photographic plate or film $c$ which plate or film $c$ is suitably connected at its upper edge to the bag $a$, as indicated by $t$ in Figs. 3 and 4. The outer bag $a$ is provided in the front with an exposure opening $d$. From the inner bag $b$ project two tongues or strips, the one $e$ at the lower, closed end and the second $f$ at the open top end, which tongues or strips project outside the camera $k$ through slits $t^3$ in the lower and upper walls of the latter (Fig. 5). The tongue or strip $f$ penetrates the back of the outer bag $a$ through a slit $f'$ the edges of which are oblique or inclined, Fig. 2, in order that the edge of the inner bag when moved inward may pass the slit without being interfered with by the edges of the same. Through this arrangement the inner bag can be easily pulled in to and out of the outer bag. When pulled in entirely the inner bag closes the opening $d$ and excludes the light. To prevent the inner bag from being drawn so far as to come wholly outside the lower edge of the plate or film $c$ the strip $f$ is of a suitable length and is provided near the end with projections $h$, which engage with the ends of the slit $f'$ when the inner bag is drawn to its outermost position and thus prevent the further moving of the inner bag. The plate or film $c$ conveniently may be fastened to a sheet of paper $g$, which latter may be fastened to the outer bag $a$ at the point $t$ before referred to. When using my holder I secure it in the camera by means of the device illustrated in the Figs. 5 and 6 and which consists of a horizontally-disposed sleeve $i$ formed at the top edge of the holder by which sleeve the holder is hung upon an arm $l$ pivotally arranged in the camera $k$ at $v$, Fig. 6. When closing the door $m$, which in the Fig. 5 is (in part) shown as opened and in Fig. 6 as fully removed the arm $l$ together with the holder becomes pressed against the walls of the camera (Fig. 5) so as to exclude the light.

I prefer to form the sleeve $i$ of that flap which is cut from the wall of the bag $a$ to form the exposure opening $d$; the said flap being cut along three edges only and being bent up and fastened at $w$ to the major portion of bag $a$. The purpose of the said method of making the sleeve $i$ is that when the inner bag is moved inward into the outer bag its edges may pass by the top edge of the exposure opening $d$, without catching against same.

The arm $l$ is made channel-shaped (see cross-section in Fig. 5) and the portion $o$ of the camera case to which said arm is opposed is convex as shown in Figs. 5 and 6. It will also be observed by reference to Fig. 5 that the camera portion $o$ is provided with a guide rail $p$, of the shape in cross-section shown in Fig. 5.

When the arm $l$ is in sleeve $i$, and the camera door $m$ is closed, the sleeve $i$ will be pressed and securely held between arm $l$ and camera portion $o$, and at the same time, the portion of the wall of the bag $a$ above the opening $d$ will be raised to a slight extent above the plate or film $c$. It will also be understood that at said time the rail $p$ will reach in through opening $d$ and keep the edge of the inner bag $b$ against the plate or film, and in that way contribute to the facility with which the forward wall of bag b can pass the upper wall of opening d when the inner bag is pulled upward.

The invention described makes it possible to pull the inner bag as well upward when closing as downward when drawn for exposure thus preventing any damages of same even if manufactured of the thinnest material possible.

It is of course to be observed that really the bags are much more compact than shown on the drawing, where they are purposely shown very bulky and expansive only to make the arrangement clear.

Through this invention the volume of the camera will be diminished as the plate magazine is dispensed with and the plates or films proper together with their envelops will take a very little more place than ordinary unprotected plates or films owing to the very thin bags.

What I claim as new, and desire to secure by Letters Patent is:

1. In a photographic film holder the combination of two bags of a thin material, the one inserted into the other, having the film fastened at one edge to the outer bag, said outer bag being provided with an exposure opening in its front and a slit in its back, and the inner bag provided with a tongue at its lower end and a similar tongue at its top end extending through said slit, both tongues being designed to reach outside a camera when the holder is placed in its proper position in the camera.

2. In a photographic film holder the combination of two bags made to slide the one into the other, and having the film fastened at one edge to the outer bag, the outer bag having a slit the edges of which are oblique, a tongue projecting from the top end of the inner bag and extending through said slit, a similar tongue projecting from the lower end of the same bag, both tongues being designed to reach outside a camera when the holder is placed in the same.

3. A photographic plate or film holder comprising bags made to slide one within the other; the inner bag having tongues, and the outer bag having a slit for the passage of one tongue and also having an exposure opening and a sleeve above said opening; said sleeve being formed of a flap displaced in the provision of the opening which flap is bent up and secured to the major portion of the outer bag.

4. The combination with a camera having a swinging arm and a portion opposed to said arm and also having openings and a door; of a plate or film holder comprising bags arranged to fit one within the other; the inner bag having tongues adapted to extend through the openings of the camera, and the outer bag having an exposure opening in its front wall, and a slit in its back wall for the passage of one tongue, and also having a sleeve above said exposure opening receiving the said swinging arm of the camera.

5. The combination with a camera having a swinging arm, of channel form, and a portion, of complementary form, opposed to said arm, and also having a guide rail on said opposed portion, and further having openings and a door; of a plate or film holder comprising bags arranged to fit one within the other; the inner bag having tongues adapted to extend through the openings of the camera, and the outer bag having an exposure opening in its front wall, and a slit in its back wall for the passage of one tongue, and also having a sleeve above said exposure opening receiving the said swinging arm of the camera.

In testimony whereof I have hereunto set my hand in presence of two subscribing witnesses.

SAMUEL KONRAD BOHLIN.

Witnesses:
GUNHILD JANSON,
ERIC A. WIDHOLM.

Copies of this patent may be obtained for five cents each, by addressing the "Commissioner of Patents, Washington, D. C."